(12) United States Patent
Yamaga et al.

(10) Patent No.: US 11,288,006 B2
(45) Date of Patent: Mar. 29, 2022

(54) STORAGE SYSTEM AND VOLUME COPYING METHOD WHERE CHANGES TO ADDRESS CONVERSION TABLE IS ROLLED BACK

(71) Applicant: Hitachi, Ltd., Tokyo (JP)

(72) Inventors: Yusuke Yamaga, Tokyo (JP); Tomohiro Kawaguchi, Tokyo (JP); Akira Deguchi, Tokyo (JP); Takaki Matsushita, Tokyo (JP); Tadato Nishina, Tokyo (JP)

(73) Assignee: HITACHI, LTD., Tokyo (JP)

( * ) Notice: Subject to any disclaimer, the term of this patent is extended or adjusted under 35 U.S.C. 154(b) by 43 days.

(21) Appl. No.: 17/001,974

(22) Filed: Aug. 25, 2020

(65) Prior Publication Data
US 2021/0173563 A1    Jun. 10, 2021

(30) Foreign Application Priority Data

Dec. 9, 2019 (JP) .............................. JP2019-222253

(51) Int. Cl.
*G06F 3/06* (2006.01)
(52) U.S. Cl.
CPC ............ *G06F 3/065* (2013.01); *G06F 3/0611* (2013.01); *G06F 3/0689* (2013.01)
(58) Field of Classification Search
CPC .................................................... G06F 3/065
See application file for complete search history.

(56) References Cited

U.S. PATENT DOCUMENTS

| | | | |
|---|---|---|---|
| 7,620,785 B1 * | 11/2009 | Coulter | G06F 11/1471 |
| | | | 711/161 |
| 2012/0311261 A1 | 12/2012 | Mizuno et al. | |
| 2016/0019115 A1 * | 1/2016 | Shuster | G06F 3/0607 |
| | | | 714/770 |

FOREIGN PATENT DOCUMENTS

JP    2014-507693 A    3/2014

* cited by examiner

*Primary Examiner* — Chie Yew
(74) *Attorney, Agent, or Firm* — Procopio, Cory, Hargreaves & Savitch LLP

(57) ABSTRACT

In a storage system having a controller constructing a provision volume provided to a server system and an addition volume in which data to be stored in the provision volume is added and stored, when a provision volume copying instruction is received, the controller inserts a start marker indicating start time point of copying into address change history information and copies address conversion information of a provision volume while receiving update data to a provision volume from the server system, as address conversion information of a copy-destination volume. On the basis of a start marker of address change history information and history information, a change from start to completion of copying of the address conversion information of a copy-destination volume is reset to a state at the start time point of copying.

11 Claims, 16 Drawing Sheets

FIG. 3B
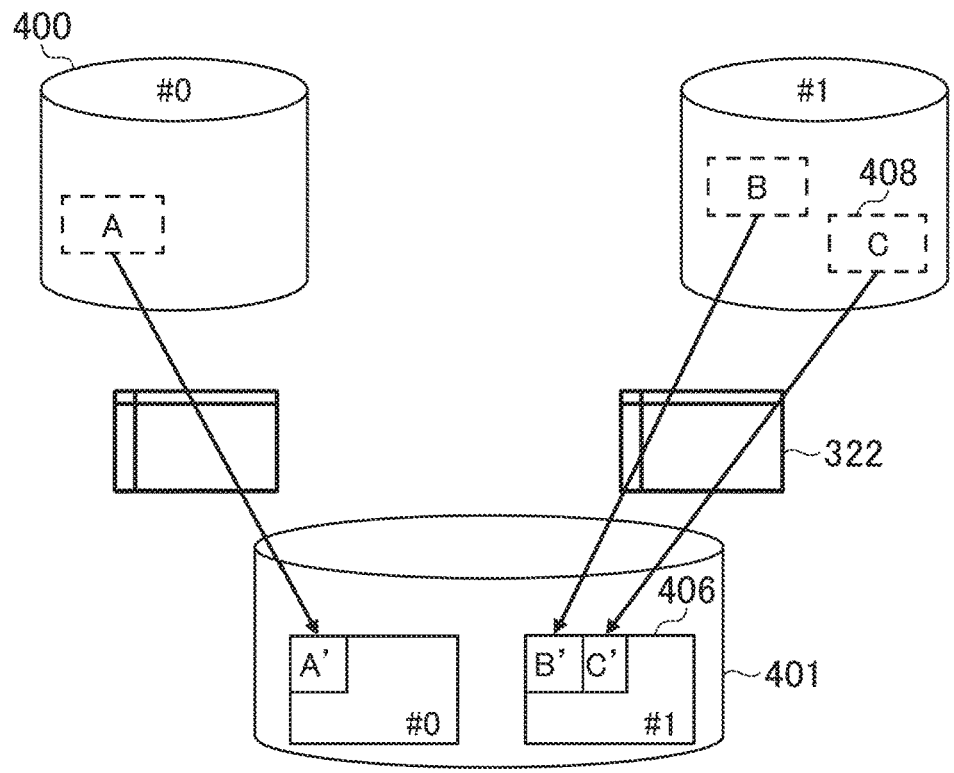
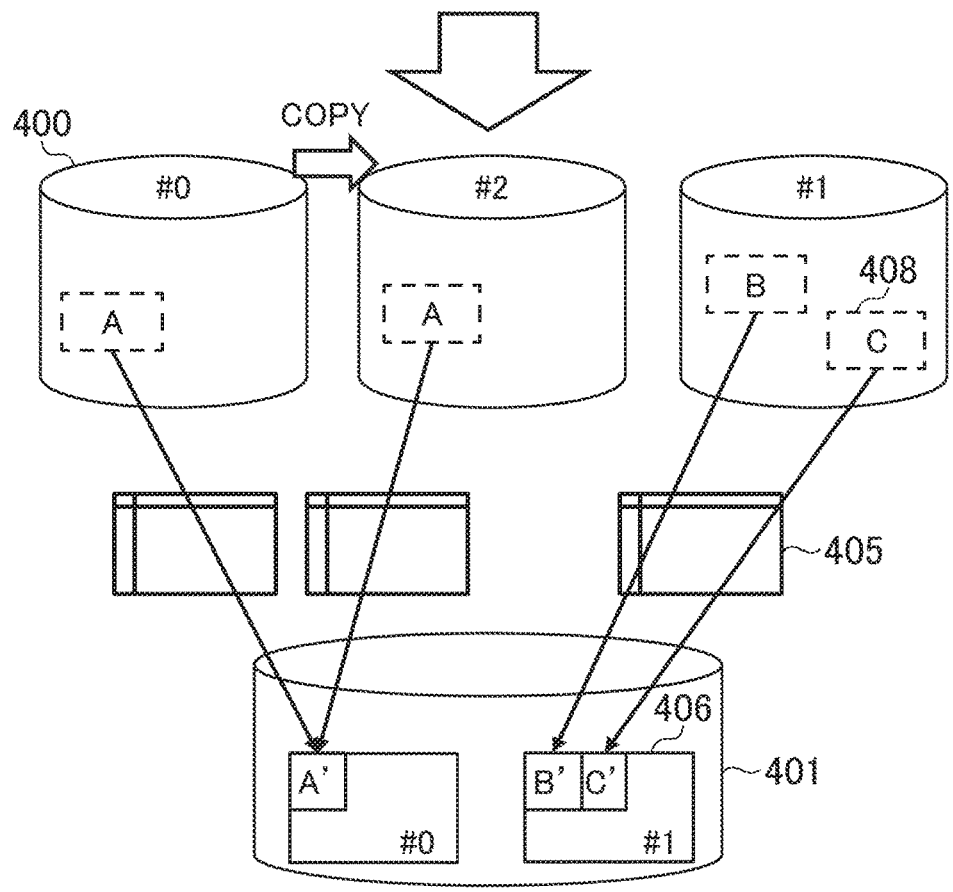

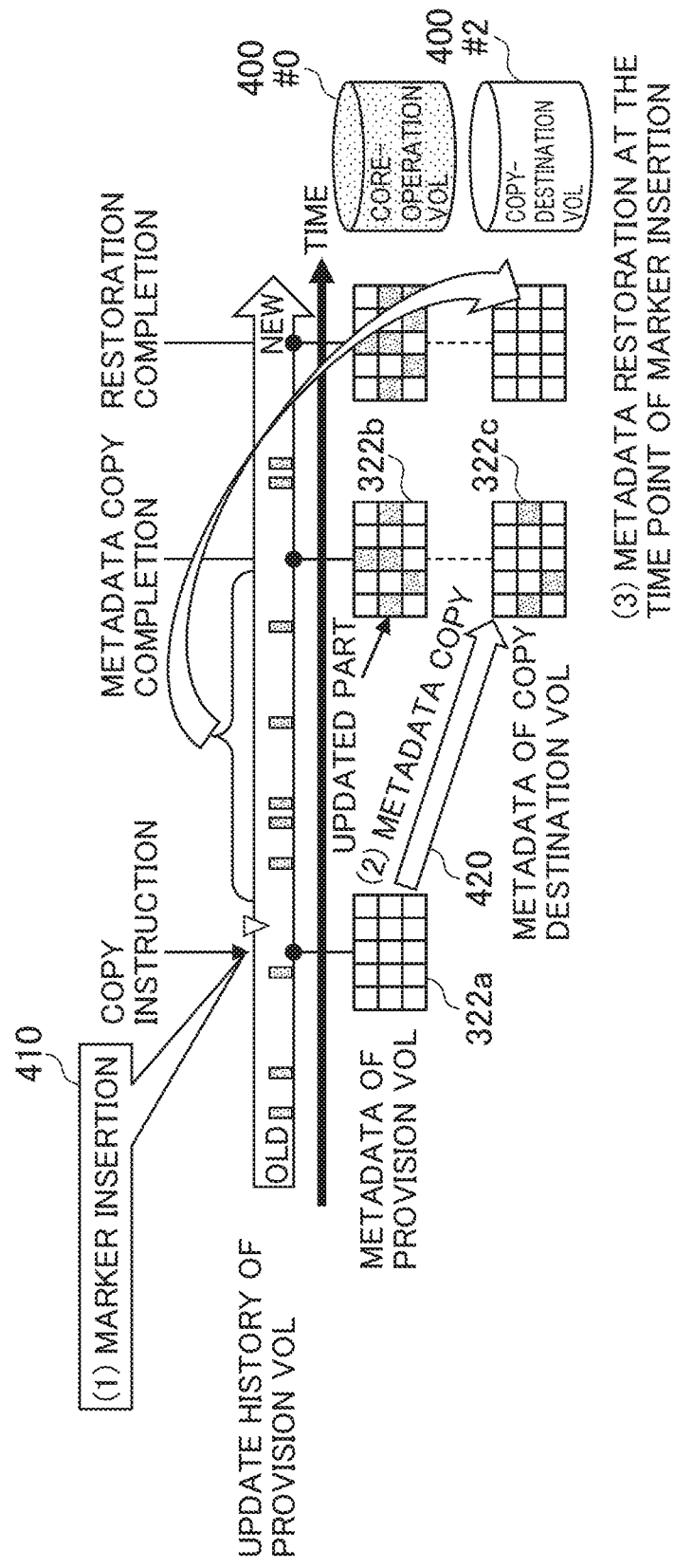

FIG. 5

VOL MANAGEMENT TABLE 321

| VOL# | VOL ATTRIBUTE | VOL CAPACITY | POOL # |
|---|---|---|---|
| 0 | PROVISION | 200GB | 0 |
| 10 | PROVISION | 200GB | 0 |
| 20 | ADDITION | 200GB | 0 |
| ... | ... | ... | ... |

ADDRESS CONVERSION TABLE 322

| ADDRESS IN VOL | REFERENCE DESTINATION VOL # | ADDRESS IN REFERENCE DESTINATION VOL | DATA SIZE |
|---|---|---|---|
| 0 | 100 | 10 | 1 |
| 10 | 300 | 50 | 5 |
| 0 | 100 | 20 | 10 |
| ... | ... | ... | ... |

ADDRESS CHANGE HISTORY TABLE 323

| TIME (HH:MM:SS) | POINTER TO ENTRY IN ADDRESS CONVERSION TABLE BEFORE UPDATE | MARKER # |
|---|---|---|
| 10:10:00 | 100 | |
| 10:10:01 | 200 | |
| 10:10:05 | – | 1 |
| ... | ... | |

PAGE CONVERSION TABLE 324

| ADDRESS IN VOL | ASSIGNMENT FLAG | PAGE # |
|---|---|---|
| 0 | ASSIGNED | 0 |
| 100 | ASSIGNED | 1 |
| 200 | NOT ASSIGNED | – |
| ... | ... | ... |

PAGE ASSIGNMENT MANAGEMENT TABLE 325

| PAGE # | ASSIGNMENT FLAG | ASSIGNMENT DESTINATION VOL # | ADDRESS IN ASSIGNMENT DESTINATION VOL |
|---|---|---|---|
| 0 | ASSIGNED | 0 | 100 |
| 1 | ASSIGNED | 1 | 200 |
| 2 | NOT ASSIGNED | – | – |
| ... | ... | ... | ... |

SUB-BLOCK MANAGEMENT TABLE 326

| PAGE # | ADDRESS IN PAGE | ASSIGNMENT FLAG | ADDRESS IN VOL | SUB-BLOCK SIZE |
|---|---|---|---|---|
| ... | ... | ... | ... | ... |

ADDITION-DESTINATION SEARCH TABLE 328

| VOL# | ADDITION-DESTINATION ADDRESS | END ADDRESS |
|---|---|---|
| 10 | 10 | 10000 |
| ... | ... | ... |

MARKER MANAGEMENT TABLE 329

| MARKER # | POINTER TO MARKER IN ADDRESS CONVERSION HISTORY TABLE |
|---|---|
| 0 | 100 |
| 1 | 200 |
| 2 | 300 |
| ... | ... |

RESTORATION ADDRESS MANAGEMENT TABLE 330

| ADDRESS IN VOL | ADDRESS IN REFERENCE DESTINATION VOL |
|---|---|
| 0 | 10 |
| 10 | 20 |
| 20 | 50 |
| ... | ... |

ADDRESS CHANGE HISTORY TABLE 331

| TIME (HH:MM:SS) | POINTER TO ENTRY IN UPDATED ADDRESS CONVERSION TABLE | MARKER # |
|---|---|---|
| 10:10:00 | 100 | |
| 10:10:01 | 200 | |
| 10:10:05 | – | 1 |
| ... | ... | |

3311 / 3312 / 3313

STORAGE SYSTEM AND VOLUME COPYING METHOD WHERE CHANGES TO ADDRESS CONVERSION TABLE IS ROLLED BACK

BACKGROUND

The present invention relates to a volume copying technique of a storage system.

A storage system is an example of a computer system. A storage system is, for example, a device configured to have a redundant configuration like an RAID (Redundant Array of Inexpensive Disks) made by a number of drives arranged in an array. At least one logical region (hereinbelow, the region will be called a logical volume) is formed from a physical storage region provided by a number of drives mounted on a storage system, and the logical volume is provided for a server system.

In recent years, the number of cases of copying a logical volume in a storage system used for core operation and using copy data for a secondary purpose such as analytics and TestDev is increasing. Japanese Unexamined Patent Application Publication (Translation of PCT Application) No. 2014-507693 discloses a storage system capable of copying a core-operation volume at a predetermined time point while continuing an access to a logical volume (core-operation volume) used for core operation.

SUMMARY

In the storage system described in Japanese Unexamined Patent Application Publication (Translation of PCT Application) No. 2014-507693 1, while continuing an access to a logical volume (core-operation volume) used for core operation, the core-operation volume can be copied. However, since data of the core-operation volume is saved using a core-operation volume write process request from a server system or the like as an occasion, the response performance to the writing process may deteriorate.

An object of the present invention is, therefore, to provide a storage system and a volume copying method capable of maintaining response performance of a core-operation volume even when a volume copying process is performed on demand.

To solve the problem, a storage system according to an aspect of the present invention has a controller, a provision volume to be provided to a server system by the controller, and an addition volume to which data to be stored in the provision volume is added and stored. When update data to a first logical address in the provision volume is received from the server system, the controller updates first address conversion information so as to manage the relation between the first logical address and a second logical address for storing the update data in the addition volume, and adds history information which manages the relation between a third logical address of the addition volume storing data which is before update of the first logical address and the first logical address to address change history information. Further, when an instruction of copying the provision volume is received, while performing a process of storing update data to the provision volume from the server system, the controller inserts a start marker indicating a start time point of copy into the address change history information, generates a copy-destination volume as a copy destination of the provision volume, copies the first address conversion information as second address conversion information of the copy-destination volume, and resets a change from the start to completion of the copy of the first address conversion information copied to the second address conversion information to the start time point of the copying on the basis of the start marker of the address change history information and the history information.

According to the present invention, a storage system capable of maintaining response performance of a core-operation volume even when a volume copying process is performed on demand can be provided.

BRIEF DESCRIPTION OF THE DRAWINGS

FIG. 3B is a diagram illustrating an example of copying of a provision volume according to the first embodiment.

FIG. 4 is a diagram illustrating operation outline of the storage system.

FIG. 5 is a diagram illustrating an example of a VOL management table according to the first embodiment.

FIG. 6 is a diagram illustrating an example of an address conversion table according to the first embodiment.

FIG. 7 is a diagram illustrating an example of an address change history table according to the first embodiment.

FIG. 8 is a diagram illustrating an example of a page conversion table according to the first embodiment.

FIG. 9 is a diagram illustrating an example of a page assignment management table according to the first embodiment.

FIG. 10 is a diagram illustrating an example of a sub-block management table according to the first embodiment.

FIG. 11 is a diagram illustrating an example of an addition-destination search table according to the first embodiment.

FIG. 12 is a diagram illustrating an example of a marker management table according to the first embodiment.

FIG. 13 is a diagram illustrating an example of a restoration address management table according to the first embodiment.

FIG. 19 is a diagram illustrating an example of an address change history table according to the second embodiment.

DETAILED DESCRIPTION

Figure 1:
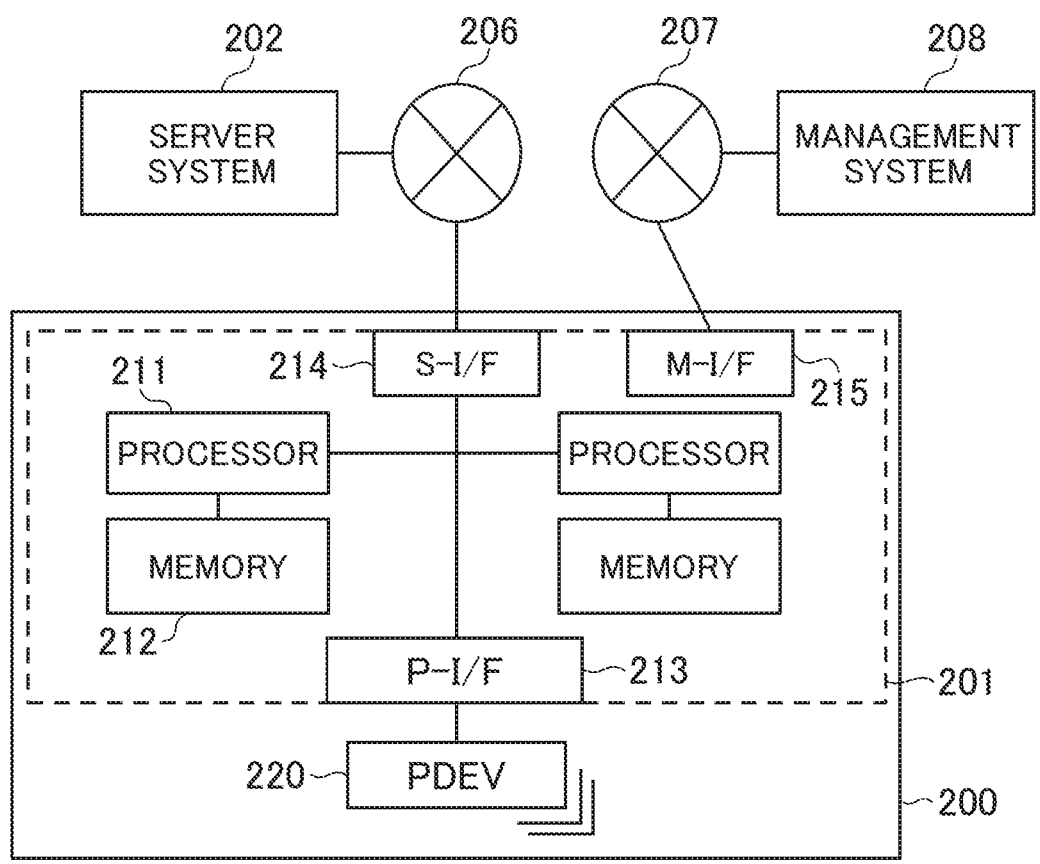
FIG. 1 is a diagram illustrating a configuration example of a system including a storage system according to a first embodiment.

In the following description, an "interface unit" may be one or more interfaces. The one or more interfaces may be one or more communication interface devices of the same kind (for example, one or more NIC (Network Interface Cards) or two or more communication interface devices of different kinds (for example, an NIC and an HBA (Host Bus Adapter)).

In the following description, a "memory" may be one or more main storage devices. At least one memory in a memory unit may be a volatile memory or a nonvolatile memory.

In the following description, a "PDEV" may be one or more auxiliary storage devices. The "PDEV" denotes a Physical storage DEVice and is typically a nonvolatile storage device and is, for example, an HDD (Hard Disk Drive) or an SSD (Solid State Drive).

In the following description, a "storage unit" is at least one in at least a part of a memory unit and a PDEV unit (typically, at least a memory unit).

In the following description, a "processor" is one or more processors. At least one processor is, typically, a microprocessor such as a CPU (Central Processing Unit) but may be a processor of another kind such as a GPU (Graphics Processing Unit). At least one processor may be a single core or a multicore.

At least one processor may be a processor in the broad sense of the term such as a hardware circuit (for example, an FPGA (Field-Programmable Gate Array) or an ASIC (Application Specific Integrated Circuit)) performing a part or all of processes.

In the following description, information obtained as an output by an input will be described by expression such as "xxx table". The information may be data of any structure or a learning model such as a neural network generating an output to an input. Therefore, the "xxx table" can be described as "xxx information".

In the following description, the configuration of each table is an example. One table may be divided into two or more tables, and all or part of two or more tables may be one table.

In the following description, in some cases, a process will be described using a "program" as a subject. Since a program performs a determined process while properly using a storage unit and/or an interface unit and the like when the program is executed by a processor unit, the subject of the process may also be the processor unit (or a device such as a controller having the processor unit).

A program may be installed in a device such as a computer and may be in, for example, a (for example, non-transitory) recording medium which can be read by a program distribution server or a computer. In the following description, two or more programs may be realized as one program, or one program may be realized as two or more programs.

In the following description, a "computer system" is a system including one or more physical computers. A physical computer may be a general computer or a dedicated computer. A physical computer may function as a computer (for example, a server system) issuing an I/O (Input/Output) request or function as a computer (for example, a storage device) inputting/outputting data in response to an I/O request.

That is, the computer system may be at least one of a server system as one or more servers issuing an I/O request and a storage system as one or more storage devices inputting/outputting data in response to an I/O request. In at least one physical computer, one or more virtual computers (for example, a VM (Virtual Machine)) may be executed. A virtual computer may be a computer issuing an I/O request or a computer inputting/outputting data in response to an I/O request.

The computer system may be a distributing system configured by one or more (typically, a plurality of) physical node devices. A physical node device is a physical computer.

By executing predetermined software by a physical computer (for example, a node device), an SDx (Software-Defined anything) may be configured in the physical computer or a computer system including the physical computer. As the SDx, for example, an SDS (Software Defined Storage) or an SDDC (Software-defined Datacenter) may be employed.

For example, by executing software having a storage function by a physical general computer, a storage system as an SDS may be configured.

As at least one physical computer (for example, a storage device), one or more virtual computers as server systems and a virtual computer as a storage controller of a storage system (typically, a device inputting/outputting data from/to a PDEV unit in response to an I/O request) may be executed.

In other words, at least such one physical computer may have both a function as at least apart of a server system and a function as at least a part of a storage system.

A computer system (typically, a storage system) may have a redundant configuration group. The redundant configuration may be a configuration in a plurality of node devices such as erasure coding, RAIN (Redundant Array of Independent Nodes) and internode mirroring or a configuration in a single computer (for example, a node device) such as one or more RAID (Redundant Array of Independent (or Inexpensive) Disks) group as at least a part of a PDEV unit.

In the following description, a "data set" is a lump of logical electronic data seen from a program such as an application program and may be, for example, any of a record, a file, a key-value pair, and a tuple.

In the following description, as identification information of various objects, identification numbers are used. Alternatively, identification information of a kind other than identification number (for example, an identifier including an alphabetical character or a code) may be employed.

In the following description, in the case where elements of the same kind are not discriminated, a reference sign (or a common sign in a reference sign) is used. In the case where elements of the same kind are discriminated, identification numbers (or reference signs) of the elements may be used.

For example, in the case of describing "pages" as a unit of a storage region without discrimination, "page 406" is described. In the case of describing pages so as to be discriminated, pages are described as "page #0" and "page #1" using numbers of the pages or as "page 406*a*" and "page 406*b*" using reference signs.

First Embodiment

Hereinafter, a first embodiment of the present invention will be described with reference to FIGS. 1 to 17.

FIG. 1 is a diagram illustrating a configuration example of a computer system including a storage system 200. The storage system 200 has a plurality of PDEVs (or one PDEV) 220 and a controller 201 connected to the plurality of PDEVs 220. Hereinafter, as it is easily understood from the functional viewpoint, the controller 201 is also called a storage controller.

The PDEV 220 denotes, as described above, a physical storage device and is, typically, a storage device having a redundant configuration by a plurality of nonvolatile storage devices, for example, an HDD (Hard Disk Drive) or SSD (Solid State Drive).

The storage controller 201 has an S-I/F 214, an M-I/F 215, a P-I/F 213, a memory 212, and a processor 211. The S-I/F 214, the M-I/F 215, and the P-I/F 213 are examples of the interface unit. The memory 212 is an example of the storage unit.

The S-I/F 214 is a communication interface device which mediates transmission/reception of data between a server system 202 and the storage controller 201. The server system 202 is connected to the S-I/F 214 via an FC (Fibre Channel) network 206.

The server system 202 transmits an I/O request (write request or read request) designating an I/O (Input/Output) request destination (for example, a logical volume number such as an LUN (Logical Unit Number) and an logical address such as an LBA (Logical Block Address)) to the storage controller 201.

The M-I/F 215 is a communication interface device which mediates transmission/reception of data between a management system 208 and the storage controller 201. The management system 208 and the server system 202 are connected to the M-I/F 215 via an IP (Internet Protocol) network 207.

The networks 206 and 207 may be the same communication network. The management system 208 manages the storage system 200.

The P-I/F 213 is a communication interface device which mediates transmission/reception of data between the plurality of PDEVs 220 and the storage controller 201. To the P-I/F 213, the plurality of PDEVs 220 (or one PDEV) are connected.

The memory 212 stores a program executed by the processor 211 and data used by the processor 211. The processor 211 executes the program stored in the memory 212. In the first embodiment, for example, a set of the memory 212 and the processor 211 is duplicated.

Figure 2:
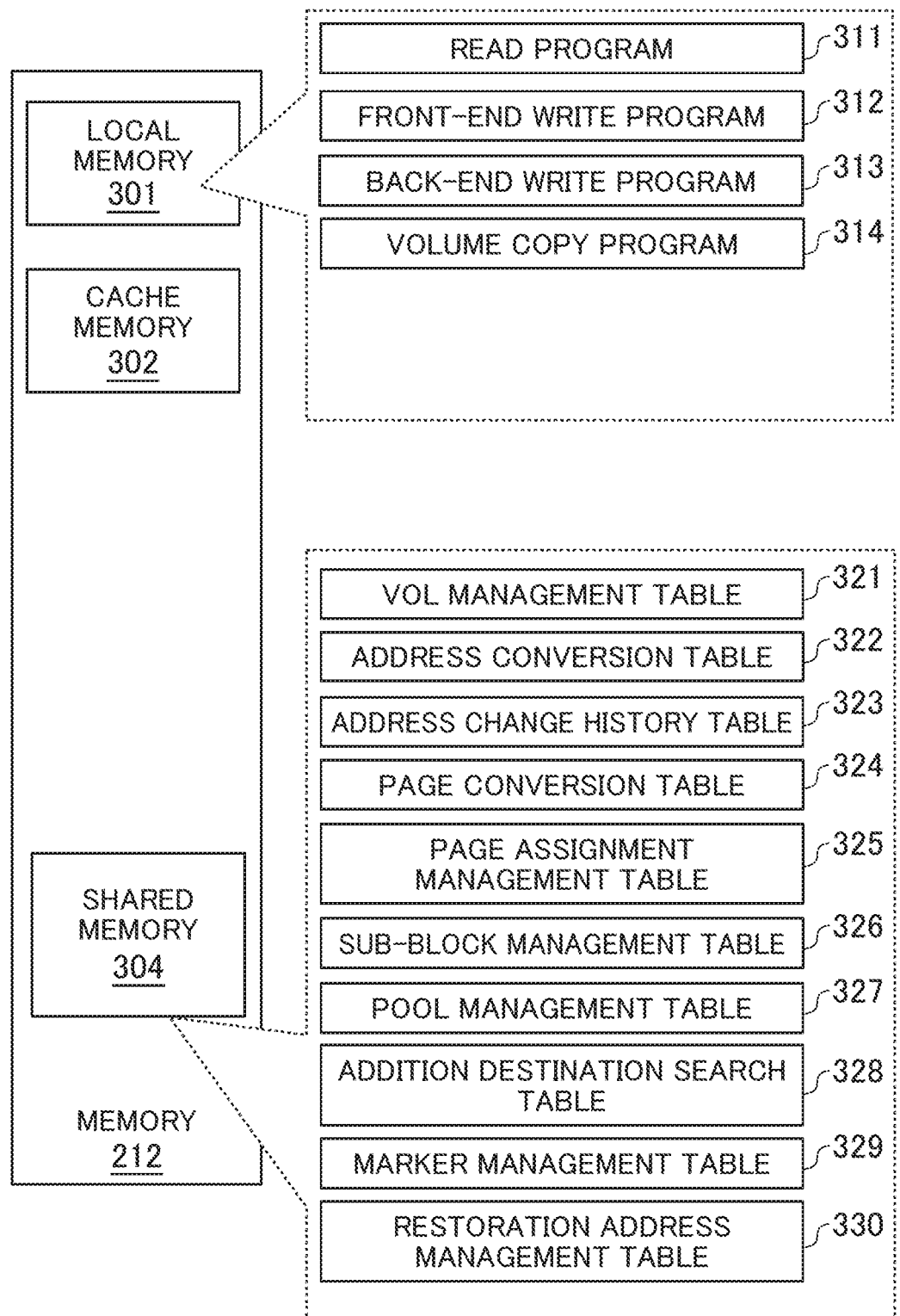
FIG. 2 is a diagram illustrating an example of the configuration of a memory and programs and management information in the memory according to the first embodiment.

FIG. 2 is a diagram illustrating an example of the configuration of the memory 212 and programs and management information in the memory 212. The memory 212 includes memory regions of a local memory 301, a cache memory 302, and a shared memory 304. At least one of the memory regions may be an independent memory. The local memory 301 is used by the processor 211 belonging to the same group of the memory 212 including the local memory 301.

In the local memory 301, a read program 311, a front-end write program 312, a back-end write program 313, and a volume copy program 314 are stored. Those programs will be described later.

In the cache memory 302, a data set which is written or read to/from the PDEV 220 is temporarily stored.

The shared memory 304 is used by both the processor 211 belonging to the same set as the memory 212 including the shared memory 304 and the processor 211 belonging to a different group. In the shared memory 304, management information is stored.

The management information includes a VOL management table 321, an address conversion table 322, an address change history table 323, a page conversion table 324, a page assignment management table 325, a sub-block management table 326, a pool management table 327, an addition-destination search table 328, a marker management table 329, and a restoration address management table 330.

Those tables except for the pool management table 327 will be described later with reference to the drawings. The pool management table 327 is a table which holds information related to a pool 403.

The pool management table 327 holds, for example, every pool 403, information of pool # (the number of the pool 403), RG # (the number of one or more RAID groups as the base of the pool 403), pool capacity (capacity of the pool 403), and pool use capacity (capacity used in the pool capacity (typically, total capacity of an assigned page in the pool 403).

Figure 3A:
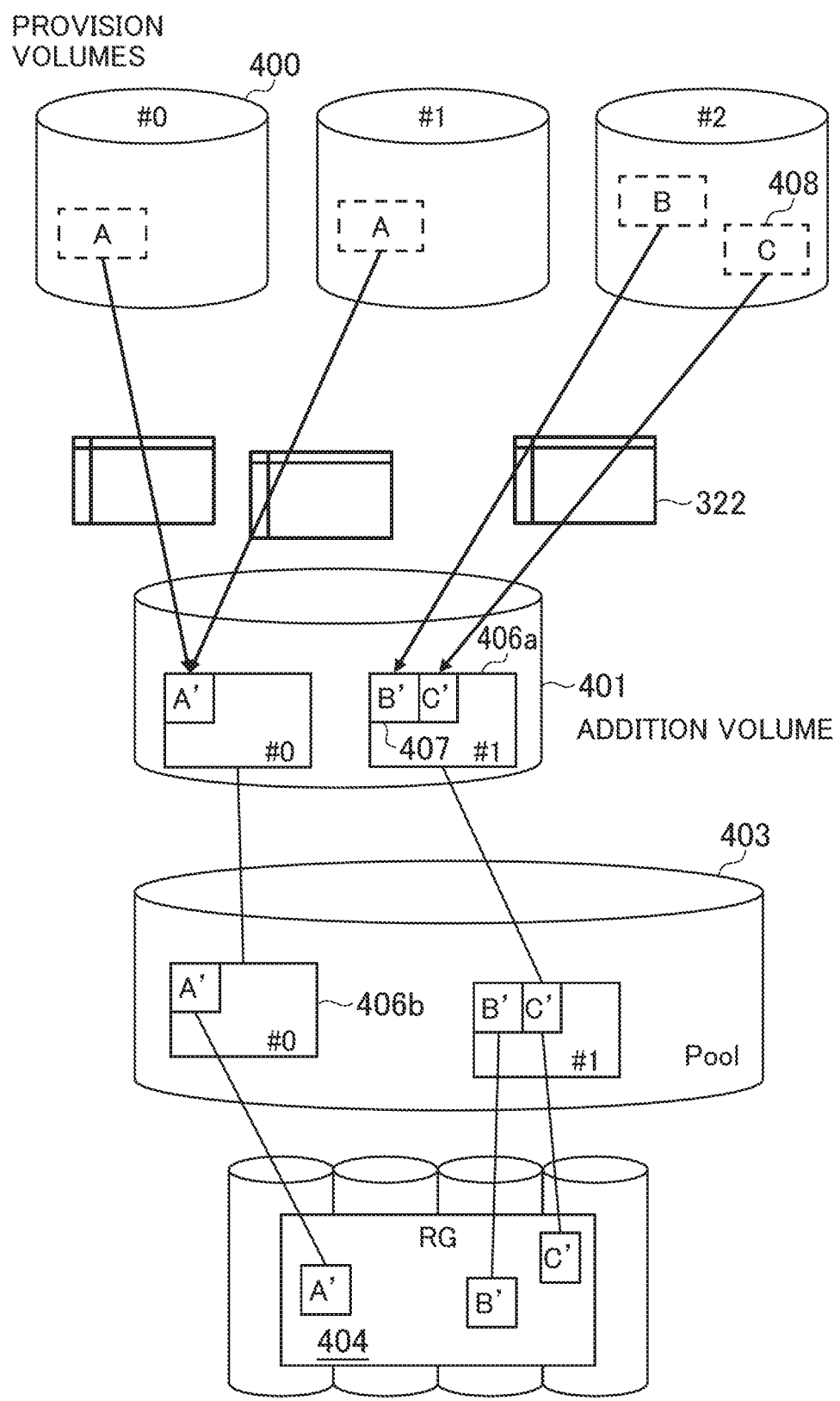
FIG. 3A is a diagram illustrating an example of a logical configuration in the storage system according to the first embodiment.

FIG. 3A is a diagram illustrating an example of a logical configuration in the storage system 200. In a storage hierarchy illustrated in FIG. 3A, in the following description, the n-th layer will be called "layer n" (n is a natural number). The smaller the n is, the higher the layer is. The storage hierarchy in the storage system 200 has provision volumes 400, an addition volume 401, the pool 403, and an RG 404. In some cases, the address conversion table 322 corresponding to a provision volume #m (VOL # is a logical volume of "m" (m denotes an integer of 0 or larger)) will be called "address conversion table #m".

The provision volume 400 is a logical storage region of layer 1 and is a logical volume which is provided to the server system 202 (which can be seen from the server system 202).

The addition volume 401 is a logical storage region of layer 2 and is a logical volume to which data stored in the provision volume 400 is added and stored. By storing update data and before-update data to the same logical address in the provision volume 400 in a different logical address in the addition volume, data written in the provision volume 400 is added to the addition volume. One addition volume 401 is associated with one or plural provision volumes 400.

The pool 403 is a logical storage region of layer 3 and is a logical storage region based on one or more RGs 404. The pool 403 is constructed by a plurality of pages 406. The pool 403 may be based on an external storage resource of the storage system 200 instead of or in addition to at least one RG 404.

The RG 404 is a logical storage region of layer 4 and is a space of an RAID group constructed by the plurality of PDEVs 220.

When a write request is received from the server system 202, the storage controller 201 compresses a data set C to be written and adds a compressed data set C' to a page 406a assigned to the addition volume 401 corresponding to the provision volume 400. That is, the page 406a is the page 406 assigned to the addition volume 401 corresponding to the provision volume 400, in other words, the page assigned indirectly to the provision volume 400.

In the page 406a, the compressed data set C' is stored in an additional writing manner. The page assigned to the addition volume 401 (the page indirectly assigned to the provision volume 400) can be said as an "addition page".

In the page 406a, the region occupied by the compressed data set will be called a "sub-block 407" in the following description.

The address conversion table 322 is provided for each provision volume 400. There are provision volumes #0, #1, and #2 so that there are address conversion tables #0, #1, and #2. In each of the address conversion tables #0, #1, and #2, it is managed so that the reference destination of a logical address (first logical address) of a provision block to which a data set is written (a provision block 408) is a logical address (second logical address) of the sub-block 407 in the addition page (the sub block 407 in which the compressed data set C' exists).

FIG. 3B is a diagram illustrating an example of copy of the provision volume #0 as a core-operation volume. The upper half illustrates a volume state before copying, and the lower half illustrates a volume state after copying.

The storage controller 201 records a change history of a storage-destination address of update data into the address change history table 323 regardless of whether a volume copying process is performed or not. Even when a copy instruction is received, the storage controller 201 does not perform a process of saving a data set of a write trigger. The reason is that if the process of saving a write-trigger data set is performed, the response performance to a process of writing to a copy-source volume of the server system 202 deteriorates.

When the storage controller 201 receives an instruction of copying the provision volume #0, the volume copy program 314 inserts a marker (start marker) to the address change history table 323. The address change history table 323 is provided for each provision volume 400. By the insertion of the start marker, information indicating the time point when the copying is instructed is recorded in the address change history table 323. After that, a provision volume #2 as the copy destination is generated, and the address conversion table #0 is copied into the provision volume #2 (the address conversion table #2 as a copy of the address conversion table #0 is generated).

Referring to FIG. 4, operation outline of the storage system of the embodiment will be described.

The storage controller 201 stores update history of metadata (address conversion table 322 (refer to FIG. 6)) of the provision volume 400 into the address change history table (refer to FIG. 7) regardless of whether the volume copying process is performed or not. In FIG. 4, metadata 322a including the address change history table is illustrated like a differential table for easier understanding.

When an instruction of copying a core-operation volume in a provision volume is received, the storage controller 201 inserts a copy start marker into the metadata 322a (the address change history table) of the core-operation volume (410).

After that, the copy destination volume (#2) is generated, and the metadata (the address conversion table 322) of the core-operation volume is copied to the copy-destination volume regardless of whether updating is performed or not (420). On the other hand, the front-end write program 312 of the core-operation volume (#0) continues processing a write request to a core-operation volume. Since the processing operation of the front-end write program 312 of the core-operation volume is the same regardless of the presence/absence of the volume copy, the response performance of the provision volume can be maintained.

At time the volume copy program 314 completes copying of the metadata (address conversion table 322), the metadata (address conversion table 322) of the core-operation volume is updated by an addition process (322b).

Since metadata of the core-operation volume is copied to the copy-destination volume regardless of whether metadata of the core-operation volume is updated or not, the metadata (322c) of the copy-destination volume at the same time is in a data inconsistency state in which the metadata does not correspond to one time point. That is, the metadata 322a of the core-operation volume at the time point when the copy instruction is received and the metadata (322c) of the copy-destination volume at the time point of metadata copy completion do not match.

The volume copy program 314 restores (rolls back) to the state (322a) of metadata of the core-operation volume at the time point of the copy instruction by using metadata change history (address change history table 323) at/after the time point of insertion of the copy start marker.

Referring again to FIG. 3B, the provision volume copying operation will be described. Since the provision volume #0 continues an access from the server system 202, the address conversion table #2 obtained by copying the address conversion table #0 does not express a state where all of entries in the table do not illustrate one time point and data consistency is not obtained. Since a writing process is executed to a copy-source provision volume during copying of the address conversion table, when update data is received for an address in a volume which is not copied in the address conversion table, the address in a volume to be referred to (addition volume) in which the update data is stored is changed, and one address conversion table shows states at a plurality of time points.

When the process of copying the address conversion table 322 is completed, the storage system 200 refers to the address change history table 323 of the provision volume #0 and restores (rolls back) the address conversion table #2 to a consistent state. Specifically, by resetting the address conversion table which is updated during the process of copying the address conversion table to the before-update state on the basis of the address change history after the start marker insertion, the state of the address conversion table at the time point when copying is instructed is restored.

By the above provision volume copying process, even if the data set saving process is not performed at the write process trigger of the copy-source provision volume, the provision volume at the time point when copying is instructed can be copied while continuing an access to the provision volume. That is, in the embodiment, since the process of saving a data set at a write trigger and the process of saving an address conversion table are not performed, the response performance of a provision volume can be maintained.

Hereinafter, management information will be described.

FIG. 5 is a diagram illustrating an example of the VOL management table 321. The VOL management table 321 is information of managing a volume generated by the storage controller 201 by an instruction from the management system 208. In the first embodiment, a logical volume provided to the server system 202 like the provision volume 400 and a logical volume which is not provided to the server system 202 like the addition volume 401 may be collectively called "VOL". By volume copying, the provision volume #2 newly provided to the server system 202 is also "VOL".

The VOL management table 321 holds information regarding a VOL. For example, the VOL management table 321 has an entry for each VOL. Entries store information such as VOL #3211, VOL attribute 3212, VOL capacity 3213, and pool #3214. Hereinafter, description will be given using one VOL (called "target VOL") as an example.

The VOL #3211 denotes the number (identification information) of a target VOL. The VOL attribute 3212 is information of the attribute of the target VOL (for example, "provision" for a provision volume and "addition" for an addition volume). The VOL capacity 3213 is information of the capacity of the target VOL. The pool #3214 is information of the number of the pool 403 associated with the target VOL.

FIG. 6 is a diagram illustrating an example of the address conversion table 322. The address conversion table 322 is set for each provision volume 400. The address conversion table 322 is information managing the relation between a logical address of a reference source (logical address of the provision volume 400) and the logical address of a reference destination (logical address of the addition volume 401) and does not always have to be in a table format.

For example, when data of the provision volume 400 is updated, an entry is newly added, and the logical address of a reference destination of updated data (also called new data) is recorded. In each entry, information such as an in-VOL address 3221, a reference-destination VOL #3221, a reference-destination in-VOL address 3223, and data size 3224 is stored. Hereinafter, description will be given using one block 408 (also called "target block") as an example.

The in-VOL address 3221 is information of the logical address (for example, the head logical address) of a target block in the provision volume 400. The reference-destination VOL #3222 is information of the number of a VOL (addition volume 401) as a reference destination of the target block.

The reference-destination in-VOL address 3223 is information of the logical address (the logical address in the reference-destination VOL) corresponding to a target block in the reference-destination VOL (addition volume) of the target block. The data size 3224 is information of the size of a compressed data set of a data set whose write destination is the target block.

FIG. 7 is a diagram illustrating an example of the address change history table 323. The address change history table 323 is set for each provision volume 400. In the address change history information, the relation between information 3231 indicating the time point when the address conversion table 322 is updated and information 3232 indicating a location where the address conversion table is updated is managed as history information.

The time 3231 is information indicating the time point when the address conversion table 322 is updated.

The pointer information 3232 to the address conversion table entry before update is information indicating the location where the address conversion table is updated (for example, information such as the address in a memory for reading each entry in the address conversion table 322). The address conversion table entry before update indicated by the pointer information 3232 manages the relation between the logical address of the provision volume 400 and the logical address of the addition volume storing before-update data, and configures history information.

In the address change history table 323, further, information of the time 3231 in which a marker is inserted and a marker #3233 is managed. The address change history table 323 does not have to be in one table format.

When the address conversion table 322 of the provision volume 400 is updated, the address change history table 323 newly adds an entry to the table.

When a marker insertion instruction is received, an entry is newly added to the address change history table 323. Each entry stores information such as the time 3231 when a marker is inserted and the marker #3233. The marker # is the number for unconditionally determining the inserted marker.

As markers, there are a start marker indicating copying start time point and a completion marker indicating completion of copying of the address conversion table 322. The start marker and the completion marker are discriminated by the marker #3233. For the discrimination, as management information, the memory 212 may also store a table for managing correspondence between a marker # which is not illustrated and a start marker or a completion marker.

FIG. 8 is a diagram illustrating an example of the page conversion table 324. The page conversion table 324 is set every provision volume 400 and every addition volume 401. The page conversion table 324 holds information related to the relation between a region (for example, page 406a) in the addition volume 401 and a page 406b as a predetermined region in the pool 403.

For example, the page conversion table 324 has an entry every region in the addition volume 401. In each entry, information such as an in-VOL address 3241, an assignment flag 3242, and a page #3243 is stored. Hereinafter, description will be given using one region (called "target region") as an example.

The in-VOL address 3241 is information of a logical address (for example, the head logical address) of a target region in the provision volume 400. As the assignment flag 3242, information of whether the page 406b is assigned in the target region ("assigned") or not assigned ("unassigned") is stored. The page number 3243 is information of the number of the page 406b of the pool 403 which is assigned to the target region.

FIG. 9 is a diagram illustrating an example of the page assignment management table 325. The relation between a page of a pool and an addition volume is managed. The page assignment management table 325 is set for each pool 403. In the page assignment management table 325, information regarding the relation between the page 406b and its assignment destination is held. For example, the page assignment management table 325 has an entry for each page 406b.

In each entry, information such as a page #3251, an assignment flag 3252, an assignment-destination VOL #3254, and an address 3255 in an assignment-destination VOL is stored. Hereinafter, description will be given using one page 406 (called "target page") as an example. The page #3251 is information of the number of a target page. The assignment flag 3252 is information of whether a target page is assigned ("assigned") or not assigned ("unassigned") to the addition volume 401.

The assignment destination VOL #3254 is information of the number of a VOL to which a target page is assigned (the addition volume 401). The address 3255 in the assignment-destination VOL is information of a logical address (for example, the head logical address) of a region in the assignment-destination VOL of the target page.

FIG. 10 is a diagram illustrating an example of the sub-block management table 326. The sub-block management table 326 is set for each addition volume 401. The sub-block management table 326 holds information related to the sub-block 407. For example, the sub-block management table 326 has an entry for each sub-block 407.

In each entry, information such as a page #3261, an address 3262 in a page, an assignment flag 3263, an address 3264 in a VOL, and a sub-block size 3265 is stored. Hereinafter, description will be given using one sub-block 407 (called "target sub-block") as an example.

The page #3261 is information of the number of the page 406a including the target sub-block. The address 3262 in a page is information of the logical address of the target sub-block in the page 406a. The assignment flag 3263 is information of whether the target sub-block is assigned ("assigned") or not assigned ("unassigned"), in other words, whether the target sub-block is being used or unused.

The address 3264 in VOL is information of the logical address of a destination to which the target sub-block is assigned (the logical address of a region in the addition volume 401). The sub-block size 3265 is information of the size of the target sub-block (the size of a compressed data set stored in the target sub-block). The address 3262 in page and the address 3264 in VOL may be the same.

FIG. 11 is a diagram illustrating an example of the addition-destination search table 328. The addition-destination search table 328 holds information of addition destination of the compressed data set. The addition-destination search table 328 has, for example, an entry for each addition volume 401. In each entry, information of a VOL #3281, an addition-destination address 3282, and an end address 3283 is stored.

Hereinafter, description will be given using one addition volume 401 (called "target addition volume") as an example. The VOL #3281 is information of the number of the target addition volume. The addition-destination address 3282 is information of the logical address of an addition destination in the target addition volume (the logical address of an addition destination in an addition page assigned to the target addition volume).

The addition-destination address 3282 is information of the logical address at the head of the addition destination. The end address 3283 is information of the end logical address in logical addresses which can become addition destinations.

In the case where the size according to the difference between the logical address of the addition destination and the end logical address is less than the compressed data size, addition is not possible. Consequently, a garbage collection process as a process of collecting an addition page is performed and, after that, the logical address at the head of the target addition volume may be set again as the addition destination.

Concretely, for example, the storage controller 201 may perform the garbage collection process preferentially from an addition page close to the logical address at the head of the target addition volume. By the process, the assignment of an addition page is cancelled preferentially from an addition page close to the logical address at the head of the target addition volume. As a result, a region may be set as unused one preferentially from a region close to the logical address at the head of the target addition volume.

FIG. 12 is a diagram illustrating an example of the marker management table 329. The marker management table 329 is set for each pool 403. The marker management table 329 manages a marker insertion position in the address change history table 323.

For example, in each entry in the marker management table 329, information of a marker #3291 and a pointer 3292 to a marker in the address change history table is stored. An entry is added when a marker is inserted in the address change history table by the volume copy program 314 or the like.

The marker #3291 is information such as a number unconditionally identifying a marker in the pool 403. The pointer 3292 to a marker in the address change history table is an address of an insertion position in the address change history table 323 of the marker #3291.

FIG. 13 is a diagram illustrating an example of the restoration address management table 330. The restoration address management table 330 holds a restoration address of the address conversion table 322 of the copy-destination provision volume 400, that is, a storage-destination address 3302 of data before update (also called old data) of the copy-source provision volume 400. The restoration address management table 330 is generated for each provision volume 400. By the restoration address management table 330, data at the copy start time point of the copy-source provision volume can be referred to.

In each entry, information of an in-VOL address 3301 of an update object of the copy-destination provision volume 400 and the address 3302 in a reference-destination VOL before update which is to be restored is stored. The restoration address management table 330 is used at the time of retrieving an entry closest to the start marker (update just before insertion of the start marker to the address in a specific VOL of the copy-source provision volume) from the address change history table 323.

As the address 3302 in a reference-destination VOL, the address 3223 in the reference-destination VOL before update closest to the start marker (just after insertion of the start marker) in update history to the same in-VOL address 3221 in the copy-source address change history table 323 is recorded.

Figure 14:
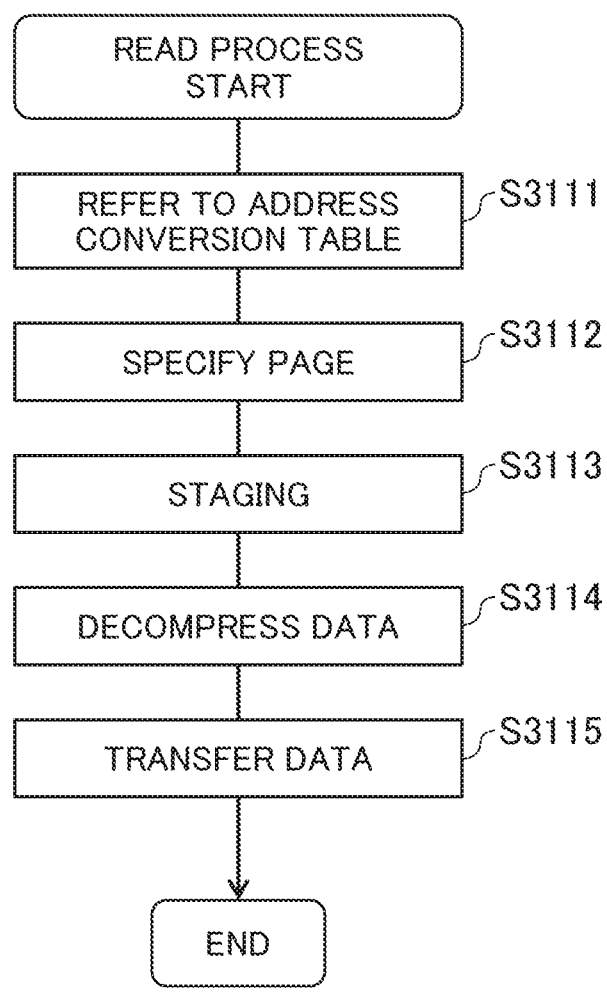
FIG. 14 is a diagram illustrating the flow of a read process according to the first embodiment.

FIG. 14 is a diagram illustrating the flow of the read program 311. The read program is executed in the case where a read request to the provision volume 400 is received. The read program 311 refers to the address conversion table 322 corresponding to a provision volume (step S3111).

The read program 311 specifies each of blocks constructing a provision volume on the basis of the address conversion table 322. After that, the read program 311 specifies the page 406*b* corresponding to the specified block on the basis of the page conversion table 324 (step S3112), reads a compressed data set corresponding to the specified block from the specified page 406*b* (step S3113), decompresses the compressed data set, and stores the decompressed data set into the cache memory 402 (step S3114). After the step S3114, the read program 311 transfers the read data to the transmission source in response to a read request (step S3115).

Figure 15:
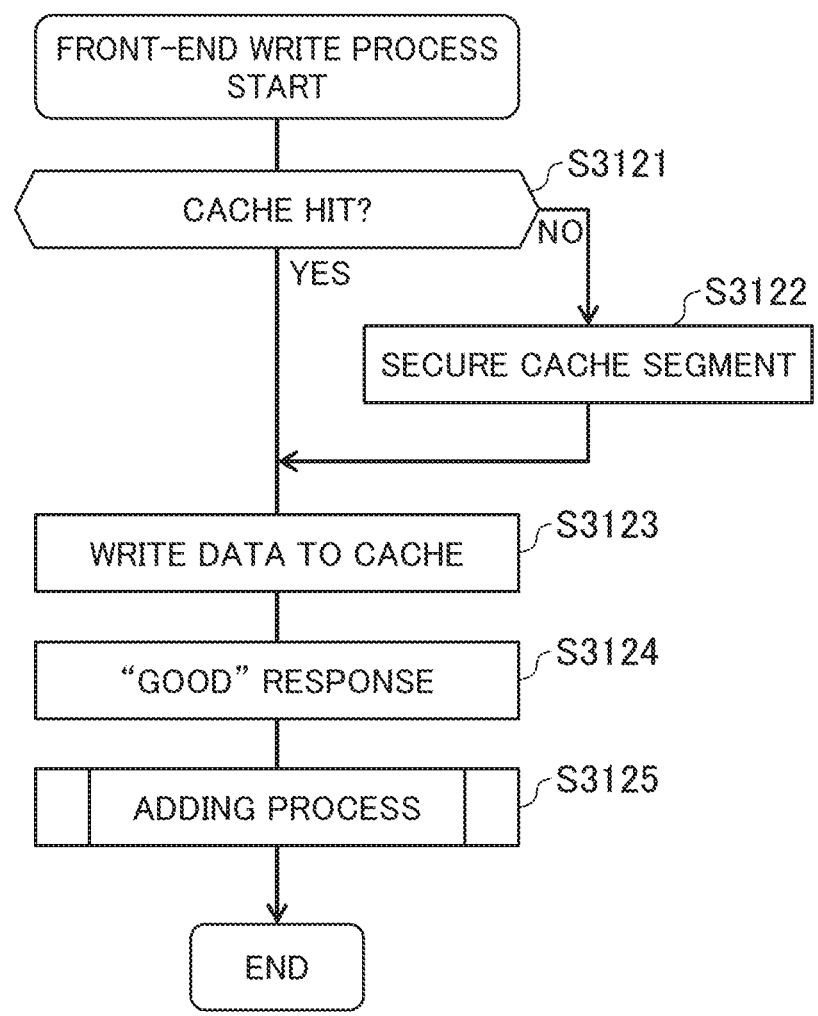
FIG. 15 is a diagram illustrating the flow of a front-end write process according to the first embodiment.

FIG. 15 is a diagram illustrating an example of the flow of a front-end writing process. The front-end writing process is performed when a write request to the provision volume 400 is received.

The front-end write program 312 determines whether cache hit occurs or not (step S3121). With respect to a write request, "cache hit" means that a cache segment (a region in the cache memory 302) corresponding to a write destination according to the write request is assured.

In the case where the result of the determination in step S3121 is false (NO in step S3121), the front-end write program 312 assures a cache segment from the cache memory 302 (step S3122).

In the case where the result of the determination in step S3121 is true (YES in step S3121) or after step S3122, the front-end write program 312 writes write target data according to the write request into the assured cache segment (step S3123).

After step S3123, the front-end write program 312 returns a "good" response (write completion report) to the transmission source of the write request (step S3124).

After step S3124, the front-end write program 312 performs an adding process (step S3125).

Figure 16:
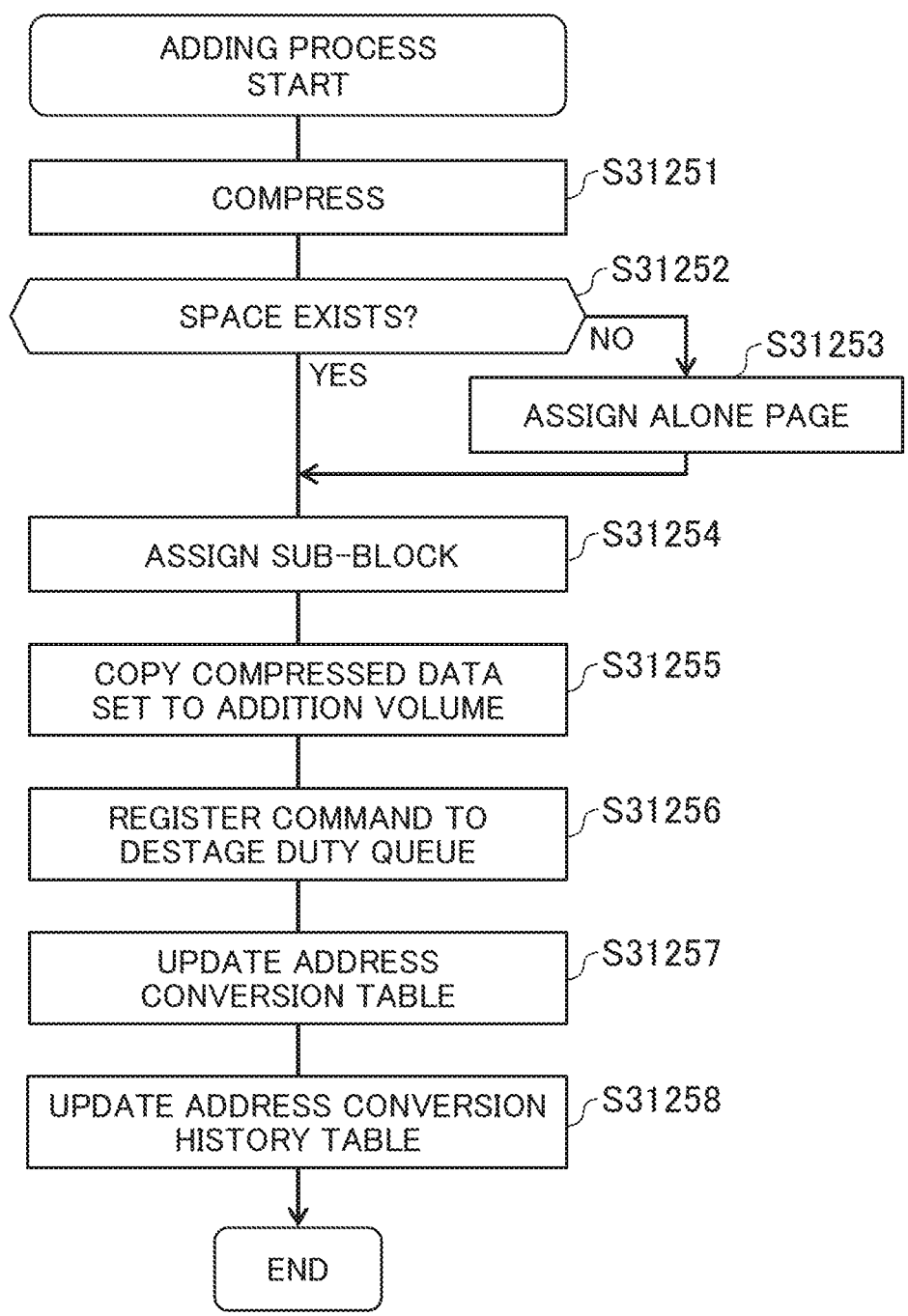
FIG. 16 is a diagram illustrating the flow of an adding process according to the first embodiment.

FIG. 16 is a diagram illustrating an example of the flow of an adding process. The front-end write program 312 compresses a write data set and stores the compressed data set to, for example, the cache memory 302 (step S31251).

The front-end write program 312 determines whether or not there is a space equal to or larger than the size of the compressed data set in the page 406*a* assigned to the addition volume 401 corresponding to the write destination volume (step S31252).

To perform the determination, for example, it is also possible to specify an address registered as information of the addition-destination address 3282 corresponding to the addition volume 401 and refer to the sub-block management table 326 corresponding to the addition volume 401 using, as a key, the number of the page 406a assigned to the region to which the specified address belongs.

In the case where the determination result of the step S31252 is false (NO in step S31252), the front-end write program 312 assigns an unassigned page 406 to the addition volume 401 corresponding to the write-destination volume (step S31253).

In the case where the determination result of the step S31252 is true (YES in step S31252) or after the step S31253, the front-end write program 312 assigns a sub-block as an addition destination (step S31254).

The front-end write program 312 copies the compressed data set of the write data set to the addition volume 401, for example, copies the compressed data set to a region for the addition volume 401 (a region in the cache memory 302) (step S31445).

The front-end write program 312 registers a write command of the compressed data set to a destage dirty queue (step S31256) and updates the address conversion table 322 corresponding to the write-destination volume (step S31257).

The "destage dirty queue" is a queue in which a write command of a dirty data set (a data set which is not stored in the page 406) as a data set which is unnecessary to be compressed is accumulated. A write command in the destage dirty queue is written in the page 406b assigned in relation to a write destination by the back-end write program 313.

As the updating of the address conversion table 322 (step S31257), concretely, the information of the reference-destination VOL #3222 corresponding to the write-destination block and the information of the address 3223 in the reference-destination VOL is changed to the number of the addition volume 401 and the logical address of the sub-block assigned in the step S31254. By the process, with respect to the update data, the correspondence between the logical address in the provision volume 400 and the logical address of the addition volume is managed.

After the step S31257, the front-end write program 312 updates the address change history table 323. Concretely, the information of the update time 3231 of the address conversion table and the pointer to an address conversion table entry before update are added to a new entry. By the operation, address information of the addition volume in which old data rewritten by update data is stored is managed as change history.

Figure 17:
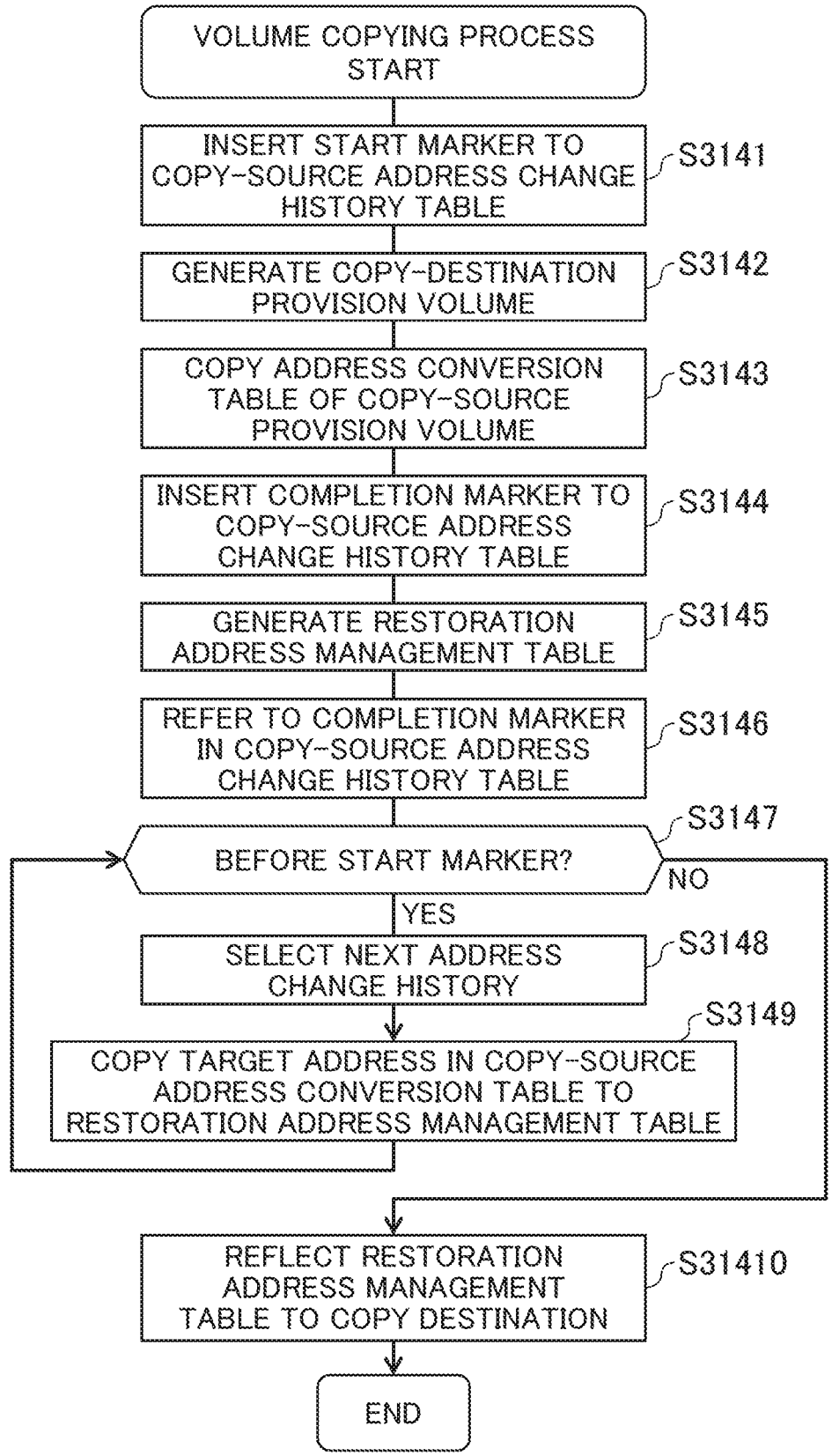
FIG. 17 is a diagram illustrating the flow of a volume copying process according to the first embodiment.

FIG. 17 is a diagram illustrating an example of the flow of the volume copying process. The provision volume copying process is performed, for example, in the case of receiving a volume copy request designating any of the provision volumes 400. Also in the volume copying process, an I/O request is continuously received from the server system 202 to the provision volume 400. Therefore, the process illustrated in FIG. 17 is performed in parallel to the processes illustrated in FIGS. 14 to 16.

The volume copy program 314 inserts a start marker to the address change history table 323 of the provision volume 400 designated as a copy source (step S3141). The step corresponds to the "(1) marker insertion" in the operation outline of FIG. 4. A start marker is inserted so that, even if the copy-source provision volume 400 is updated after that, update after insertion of the start marker is rolled back, and an image of the copy-source provision volume 400 at the time point of insertion of the start marker is copied to the copy-destination provision volume.

The volume copy program 314 generates the copy-destination provision volume 400 (step S3142). Concretely, the number of the copy-destination provision volume 400 is set in the VOL #3211 in the VOL management table 321, "provision" is set in the VOL attribute 3212, and information is set in each of the VOL capacity 3213 and the pool #, thereby generating the address conversion table 322 of the copy-destination provision volume 400. It corresponds to the step of generating a copy-destination volume in the operation outline of FIG. 4.

The volume copy program 314 copies information of the address conversion table 322 in the copy-source provision volume 400 to the address conversion table 322 for the copy-destination provision volume 400 (step S3143). In the operation outline of FIG. 4, it is the step corresponding to "(2) metadata copy". At the time point of completion of step S3143, the volume copy program 314 inserts a completion marker to the address change history table 323 of the copy-source provision volume 400 (step S3144). By inserting the completion marker, an entry of the address change history table 323 between the start marker and the completion marker can be specified. That is, the address change history to be processed can be lessened.

The start marker and the completion marker may be managed in a table which is different from the address change history table 323. That is, since they are inserted to specify updating of the copy-source provision volume after start of copying by the address conversion table, they do not have to be managed together with a pointer to an entry in an address conversion table before update in the address change history table 323.

As the address conversion table 322 of the copy-destination provision volume 400 after completion of copying of the address conversion table (step S3143), the address conversion table 322 is copied while continuing an access to the copy-source provision volume 400. Consequently, all of entries in the table do not express the state at one time point, and data consistency is not obtained.

The volume copy program 314 restores (rolls back) the address conversion table 322 of the copy-destination provision volume 400 in the above-described state to the state at the time when the copy request is received. In the operation outline in FIG. 4, metadata of the copy-destination volume at the time point of completion of copy of the metadata is restored (rolled back) to the metadata state of the core-operation volume at the time point of completion of restoration, that is, at the time point of the copy instruction.

The volume copy program 314 generates the restoration address management table 330 to retrieve an entry closest to the start marker (immediately after insertion of the start marker) from the address change history table 323 (step S3145). That is, in the restoration address management table 330, the address 3223 in the reference-destination VOL before update closest to the start marker in the update history to the address 3221 in the same VOL in the copy-source address change history table 323 is recorded.

The volume copy program 314 refers to the marker management table 329 and refers to a completion marker of the copy-source address change history (step S3146). The operation is performed to specify the number of entries to be processed since it is unnecessary to consider the address change history after completion.

The volume copy program determines whether it is before the start marker or not (step S3147).

In the case where the result of the determination in step S3147 is true (YES in step S3147), the volume copy program 314 selects an address change history in which the update time 3231 of the address change history table 323 is the second oldest (step S3148). Instead of selecting all of update histories between the start marker and the completion marker, it is also possible to compare the copy-source address conversion table and the copy-destination address conversion table and execute the step S3148 with respect to a common update history. In this case, the address update history to be processed can be lessened.

The volume copy program refers to the pointer 3232 to an address conversion table entry before update in the address change history table 323 selected in step S3148 and copies the address 3223 in the reference-destination VOL in the address conversion table 322 of the copy-source provision volume 400 to the restoration address management table 330 (step S3149).

In the case where the result of the determination in step S3147 is false (NO in step S3147), it is at/after the start marker of the copy-source address change history table 323, so that the volume copy program 314 copies the address 3302 in the reference-destination VOL in the restoration address management table 330 to the copy-destination address conversion table 322.

As described above, the address conversion table of the copy-source provision volume is not copied while maintaining data consistency at the write trigger and, after completion of copy of an address conversion table of a copy-source provision volume, the address conversion table of the copy-source provision volume at predetermined time point can be restored.

Second Embodiment

Hereinafter, a second embodiment of the present invention will be described with reference to FIGS. 18 to 20.

In the first embodiment, the state of the copy-source provision volume at time when a volume copy request is received is restored (time when a start marker is inserted). In the second embodiment, a method of restoring the time point when copying of an address conversion table (step S3143) is completed will be described.

Figure 18:
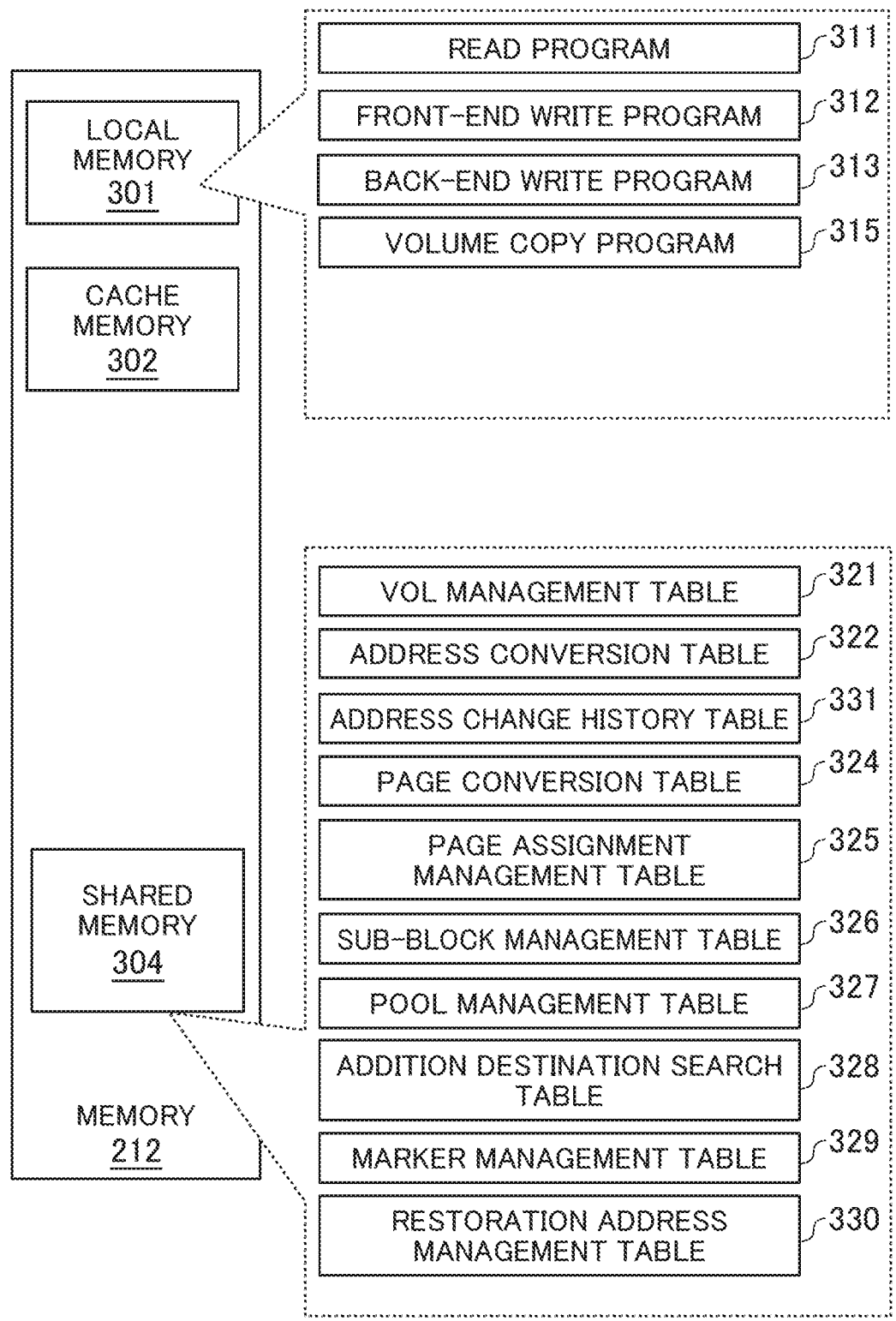
FIG. 18 is a diagram illustrating an example of the configuration of a memory and programs and management information in the memory according to a second embodiment.

FIG. 18 is a diagram illustrating an example of the configuration of the memory 212 and programs and management information in the memory 212. It is different from FIG. 2 with respect to a volume copy program 315 and an address change history table 331.

In the local memory 301, the read program 311, the front-end write program 312, the back-end write program 313, and the volume copy program 315 are stored.

In the cache memory 302, a data set which is written/read to/from the PDEV 220 is temporarily stored.

The shared memory 304 is used by both the processor 211 belonging to the same group as the memory 212 including the shared memory 304 and the processor 211 belonging to a different group. In the shared memory 304, management information is stored.

The management information includes the VOL management table 321, the address conversion table 322, the address change history table 331, the page conversion table 324, the page assignment management table 325, the sub-block management table 326, the pool management table 327, the addition-destination search table 328, the marker management table 329, and the restoration address management table 330.

FIG. 19 is a diagram illustrating an example of the address change history table 331 of the second embodiment.

The address change history table 331 is set for each provision volume 400. The address change history table 331 holds information of time when the address conversion table 322 of the provision volume 400 is updated, pointer information to an updated address conversion table entry, time 3311 when a marker is inserted, and a marker #3313.

Figure 20:
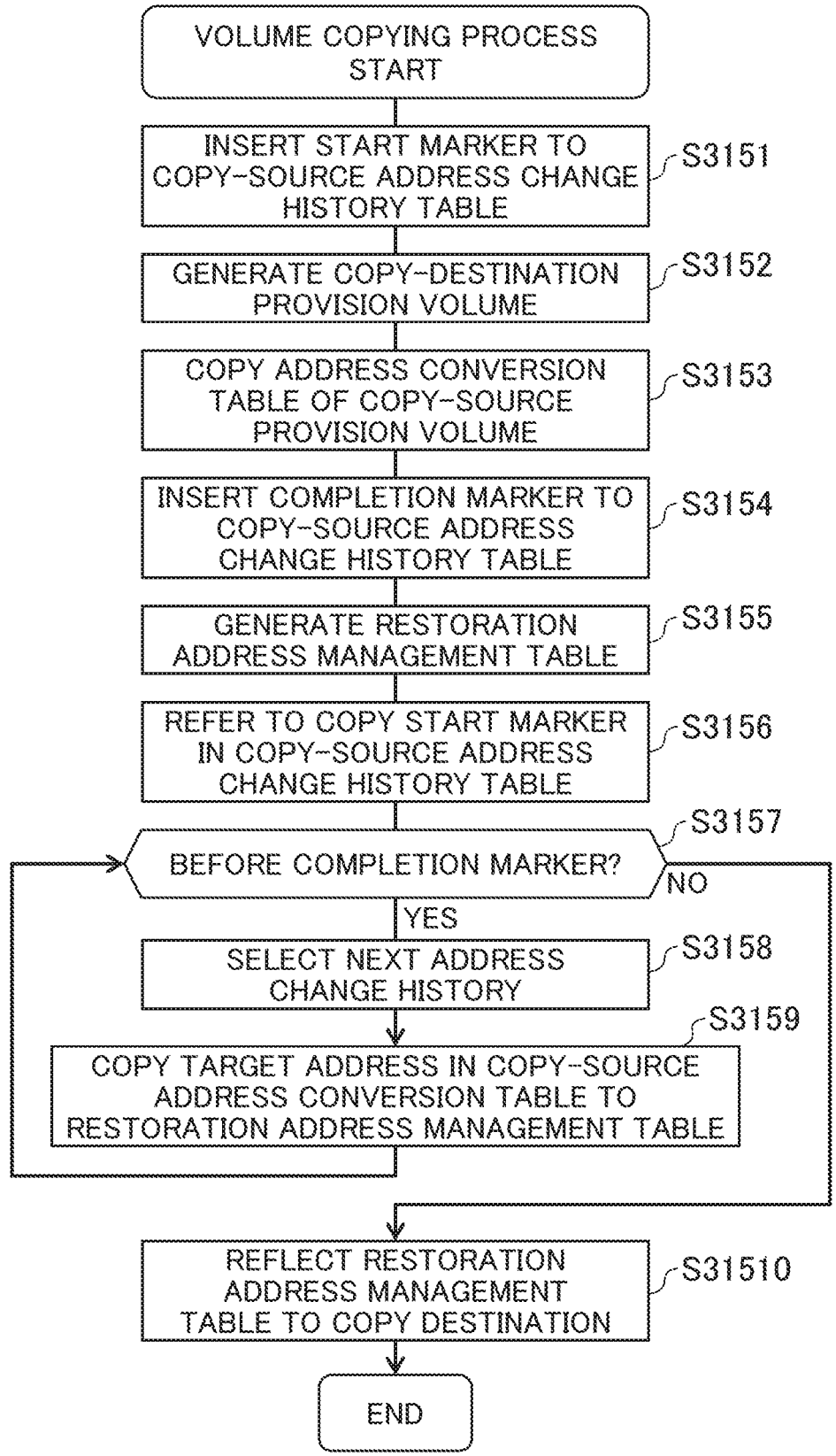
FIG. 20 is a diagram illustrating the flow of a volume copying process according to the second embodiment.

FIG. 20 is a diagram illustrating an example of the flow of a volume copying process according to the second embodiment. The volume copy program 315 inserts a start marker to the address change history table 323 of the provision volume 400 designated as a copy source (step S3151).

The volume copy program 315 generates the provision volume 400 as a copy destination (step S3152).

The volume copy program 315 copies the information of the address conversion table 322 of the copy-source provision volume 400 to the address conversion table 322 of the copy-destination provision volume 400 (step S3153). After completion of the step S3153, the volume copy program 315 inserts a completion marker in the address change history table 323 of the copy-source provision volume 400 (step S3154).

Since the address conversion table 322 is copied while continuing an access to the copy-source provision volume 400, all of entries in the table do not express a state at one time point like the first embodiment, and the address conversion table 322 of the copy-destination provision volume 400 after completion of copy of the address conversion table (step S3153) is in a state where data consistency is not obtained.

The volume copy program 315 restores the address conversion table 322 of the copy-destination provision volume 400 of the above-described state to the state at the time of completion of the address conversion table copy (step S3153). The volume copy program 315 generates the restoration address management table 330 to retrieve an entry closest to a copy completion marker from the address change history table 331 (step S3155). That is, in the restoration address management table 330, the address 3223 in the reference-destination VOL after update closest to the copy completion marker in the history of update to the address 3221 in the same VOL of the copy-source address change history table 323 is recorded.

The volume copy program 315 refers to the marker management table 329 and refers to the completion marker of the copy-source address change history table (step S3156).

The volume copy program 315 determines whether it is before a copy completion marker or not (step S3157).

In the case where the result of the determination in step S3157 is true (YES in step S3157), the volume copy program 315 selects the address change history in which the update time 3231 of the address change history table 323 is the next newest (step S3158).

The volume copy program refers to the pointer 3232 to the updated address conversion table entry in the address change history table 323 selected in step S3158 and copies the address 3223 in the reference-destination VOL of the address conversion table 322 of the copy-source provision volume 400 (step S3159).

In the case where the determination result of step S3157 is false (NO in S3157), it reaches the completion marker in the copy-source address change history table 323, so that the volume copy program 315 copies the address 3302 in the reference-destination VOL in the restoration address management table 330 to the copy-destination address conversion table 322.

Although the embodiments have been described above, they are just an example of the present invention and the gist is not limitation of the scope of the present invention only to the embodiments. For example, although the process of virtual volume copy which does not accompany movement of data has been described in the foregoing embodiments, there is also a case that a virtually copied volume is used generally as a snapshot.

A snapshot stores a state of a volume at a certain time point. However, in the case of using a snapshot particularly for the use of backup, a copy destination does not always have to be a provision volume. At the time of reading/writing snapshot data from/to the server system 202, it is sufficient to assign a provision volume.

The present invention can be executed in other various modes. For example, although a transmission source of an I/O request (I/O source) such as a write request is the server system 202 in the foregoing embodiments, it may be a not-illustrated program in the storage system 200 (for example, an application program which is executed on a VM).

What is claimed is:

1. A storage system comprising:
   a controller;
   a provision volume provided to a server system by the controller;
   and an addition volume to which data, to be stored in the provision volume, is added and stored,
   wherein when update data to a first logical address in the provision volume is received from the server system, the controller updates first address conversion table to indicate relation between the first logical address and a second logical address utilized in storing the update data in the addition volume
   and adds history information, which manages relation between the first logical address and a third logical address of the addition volume storing before-update data of the first logical address, to address change history table,
   and when an instruction to copy the provision volume is received, while performing a process of storing additional update data from the server system to the provision volume,
   the controller inserts a start marker, indicating a start time point of copying the provision volume, into the address change history table,
   generates a copy-destination volume as a copy destination of the provision volume,
   copies the first address conversion table to second address conversion table of the copy-destination volume,
   and rolls back the second address conversion table by resetting, based on the history information and the start marker in the address change history table, a change, from the start time point to completion of the copying of the first address conversion table to the second address conversion table, to the start time point of the copying the provision volume.

2. The storage system according to claim 1, wherein the first address conversion table manages relation between a logical address of the provision volume and a logical address of the addition volume.

3. The storage system according to claim 2, wherein the address change history table manages relation between information indicating time point when the address conversion table is updated and information indicating a location where the address conversion table is updated.

4. The storage system according to claim 3, wherein the controller inserts a completion marker, indicating completion of the copying of the first address conversion table to the second address conversion table, to the address change history table.

5. The storage system according to claim 3, wherein the controller manages the start marker together with information indicating the start time point of the copying the provision volume.

6. The storage system according to claim 3, wherein when information, indicating first time point that the address change history table is updated, is before the start time point indicated by the start marker, the controller manages information, indicating address location corresponding to next oldest updated time point of the address change history table, in restoration address management table.

7. The storage system according to claim 6, wherein the controller reflects information, indicating before update location stored in the restoration address management table, into the second address conversion table of the copy-destination volume.

8. A volume copying method of a storage system comprising a controller constructing a provision volume provided to a server system and an addition volume to which data, to be stored in the provision volume, is added and stored,
   wherein responsive to update data to a first logical address in the provision volume is received from the server system, the controller updates first address conversion table to indicate relation between the first logical address and a second logical address utilized in storing the update data in the addition volume
   and adds history information, which manages relation between the first logical address and a third logical address of the addition volume storing before-update data of the first logical address, to address change history table,
   and responsive to an instruction to copy the provision volume is received, while performing a process of storing additional update data from the server system to the provision volume,
   the controller inserts a start marker, indicating a start time point of copying the provision volume, into the address change history table,
   generates a copy-destination volume as a copy destination of the provision volume,
   copies the first address conversion table to second address conversion table of the copy-destination volume,
   and rolls back the second address conversion table by resetting, based on the history information and the start marker in the address change history table, a change, from the start time point to completion of the copying of the first address conversion table to the second address conversion table, to the start time point of the copying the provision volume.

9. The volume copying method according to claim 8, wherein the controller manages, in the address change history table, relation between information indicating time point the address conversion table is updated and information indicating a location the address conversion table is updated.

10. The volume copying method according to claim 9, wherein responsive to information, indicating first time point that the address change history table is updated, is before the start time point indicated by the start marker, the controller manages information, indicating address location corresponding to next oldest updated time point of the address change history table, in restoration address management table.

11. The volume copying method according to claim 10, wherein the controller reflects information, indicating before update location stored in the restoration address management table, into the second address conversion table of the copy-destination volume.

* * * * *